(12) United States Patent
Ueno

(10) Patent No.: US 9,608,924 B2
(45) Date of Patent: Mar. 28, 2017

(54) NETWORK SYSTEM, FRONT-END UNIT AND CONTROL MESSAGE TRANSMISSION RATE REDUCING METHOD

(71) Applicant: Hiroshi Ueno, Tokyo (JP)

(72) Inventor: Hiroshi Ueno, Tokyo (JP)

(73) Assignee: NEC CORPORATION, Tokyo (JP)

(*) Notice: Subject to any disclaimer, the term of this patent is extended or adjusted under 35 U.S.C. 154(b) by 137 days.

(21) Appl. No.: 14/347,730

(22) PCT Filed: Sep. 27, 2012

(86) PCT No.: PCT/JP2012/074976
§ 371 (c)(1),
(2) Date: Mar. 27, 2014

(87) PCT Pub. No.: WO2013/047705
PCT Pub. Date: Apr. 4, 2013

(65) Prior Publication Data
US 2014/0233393 A1 Aug. 21, 2014

(30) Foreign Application Priority Data

Sep. 27, 2011 (JP) .................................. 2011-210456

(51) Int. Cl.
*H04L 12/26* (2006.01)
*H04L 12/835* (2013.01)
(Continued)

(52) U.S. Cl.
CPC .............. *H04L 47/30* (2013.01); *H04L 45/38* (2013.01); *H04L 45/745* (2013.01); *H04L 47/323* (2013.01)

(58) Field of Classification Search
None
See application file for complete search history.

(56) References Cited

U.S. PATENT DOCUMENTS 7,440,457 B2 10/2008 Okuno
2004/0213272 A1* 10/2004 Nishi ................ H04L 29/12009
370/401

(Continued)

FOREIGN PATENT DOCUMENTS

CN 1606291 A 4/2005
EP 2 530 886 A1 12/2012

(Continued)

OTHER PUBLICATIONS

Extended European Search Report dated Apr. 24, 2015.

(Continued)

*Primary Examiner* — Minh-Trang Nguyen
(74) *Attorney, Agent, or Firm* — McGinn IP Law Group, PLLC

(57) ABSTRACT

A transmission rate of a control message between a switch and a switch controller can be reduced. A network system includes the switch which transfers a packet based on a switch flow table, the switch controller and a front-end unit which relays the control message between the switch controller and the switch. The front-end unit includes a buffer, a flow table storage section and a buffer control section which buffers the control message which hits a buffer flow entry of the flow table in the buffer.

20 Claims, 6 Drawing Sheets

(51) Int. Cl.
  *H04L 12/721* (2013.01)
  *H04L 12/823* (2013.01)
  *H04L 12/741* (2013.01)

(56) References Cited

U.S. PATENT DOCUMENTS

| | | |
|---|---|---|
| 2005/0074005 A1 | 4/2005 | Okuno |
| 2011/0261825 A1 | 10/2011 | Ichino |
| 2011/0286332 A1 | 11/2011 | Mizukoshi |
| 2011/0307628 A1 | 12/2011 | Chiba |

FOREIGN PATENT DOCUMENTS

| | | |
|---|---|---|
| JP | 2004-304371 A | 10/2004 |
| JP | 2005-117206 A | 4/2005 |
| JP | 2010-045502 A | 2/2010 |
| WO | WO 2010/103909 A1 | 9/2010 |
| WO | WO 2011-065227 A1 | 6/2011 |
| WO | WO 2011/115168 A1 | 9/2011 |

OTHER PUBLICATIONS

"OpenFlow Switch Specification Version 1.0.0 (Wire Protocol 0X01)", Internet Citation, Dec. 31, 2009, pp. 1-42, XP008166937, Retrieved from the Internet: URL: http://web.archive.org/web20100601182810/http://www.openflowswitch.org/documents/openflow-spec-v1.0.0.pdf [retrieved on Jan. 24, 2014].

International Search Report in PCT/JP2012/060359 dated May 22, 2012 (English Translation Thereof).

Nick McKeown et al, "OpenFlow: Enabling Innovation in Campus Networks" http://www.openflowswitch.org/documents/openflow-wp-latest.pdf, Mar. 14, 2008.

International Search Report in PCT/JP2012/074976 dated Dec. 11, 2012 (English Translation Thereof).

English translation of PCT/ISA/237 (written opinion of the international searching authority, dated Dec. 11, 2012).

PCT/IB/373 dated Apr. 1, 2014.

Chinese Office Action (and Search Report) dated Dec. 3, 2015 with a partial English translation thereof.

Chinese Office Action dated Sep. 29, 2016 with an English translation.

\* cited by examiner

NETWORK SYSTEM, FRONT-END UNIT AND CONTROL MESSAGE TRANSMISSION RATE REDUCING METHOD

TECHNICAL FIELD

The present invention relates to a network system, and more particularly relates to a technique for reducing a transmission rate of a control message between a switch and a switch controller.

BACKGROUND ART

In recent years, an OpenFlow technique is proposed in a research field of a new network control. In the OpenFlow technique, Non-Patent Literature 1: "OpenFlow: Enabling Innovation in Campus Networks" is known. In the OpenFlow technique, a communication is considered in units of flows of End-to-End, and a route control, trouble recovery, load distribution and optimization of the network are carried out in the flow unit. An OpenFlow switch switches a transfer packet on the basis of a flow table that is added and updated by an OpenFlow switch controller in accordance with an OpenFlow protocol.

The network that uses the OpenFlow protocol is characterized in that a switch controller (control system) and a switch (packet transfer system) are separated. When receiving a packet, the OpenFlow switch carries out processing of the packet in accordance with an action defined in a corresponding entry, if the entry exists in the flow table. On the other hand, if there is not the corresponding entry, the reception of the packet is notified to the OpenFlow switch controller. When processing of the received packet cannot be determined, the OpenFlow switch transmits data of the received packet to the OpenFlow switch controller. Typically, the OpenFlow switch transmits all of the received packets to the OpenFlow switch controller in an initial state in which any entry does not exist in the flow table.

In a flow in which a handshake such as TCP (Transmission Control Protocol) is carried out, unless the OpenFlow switch transfers an SYN packet of a terminal to a destination terminal, an SYN+ACK packet is not returned from the destination terminal. The OpenFlow switch can carry out a congestion control of a network, by using the above-mentioned mechanism to perform a rate control on a communication between the terminals.

When a flow table is set in an OpenFlow switch and service traffic already exists, there is a case that the flow table is initialized due to a trouble of the OpenFlow switch. In such a case, because the OpenFlow switch cannot determine a transfer method of reception packets, the OpenFlow switch transmits data of all of the reception packets to an OpenFlow switch controller. There is a possibility that those packets include a plurality of data of the packets to hit a same flow table entry. The OpenFlow switch controller must process redundant packet data, and as the result of this, a load of the OpenFlow switch controller increases.

In the network having an architecture in which the switch (data transfer processing) and the switch controller (control processing) are separated, as in the network using the OpenFlow protocol, there is a case that the traffics of the packets transferred from the switch to the switch controller are more in order to determine the transfer method, which results in the bottle neck of the packet transfer processing.

As the related invention, JP 2010-45502A (Patent Literature 1) is known. JP 2010-45502A (Patent Literature 1) discloses that influence on a network is suppressed when a high load state is caused on the side of a switch controller. In this conventional technique, a monitoring manager compares a load of the switch controller connected to the switch of a plurality of switch controllers with a predetermined value. As the result of the comparison, if the load is greater than the predetermined value, a switch controller that is not in an activation state is newly activated, and a connection to the newly activated switch controller is instructed to the switch. If the connection to the newly activated switch controller is instructed from the monitoring manager, the switch carries out a connection request to the newly activated switch controller. The newly activated switch controller is connected to the switch requesting the connection to control the switch.

JP 2010-45502A solves a problem by increasing the number of switch controllers so as to distribute a load, when the load of the switch controller increases. However, a subject that the redundant packets must be processed is not solved for the switch controller.

CITATION LIST

[Patent Literature 1]: JP 2010-45502A
[Non-patent Literature 1]: "OpenFlow: Enabling Innovation in Campus Networks"<http://www.openflowswitch.org/documents/openflow-wp-latest.pdf>

SUMMARY OF THE INVENTION

An object of the present invention is to provide a network system which can reduce a transmission rate of a control message between a switch and a switch controller.

The network system of the present invention includes a switch configured to transfer a packet based on a switch flow table; a switch controller configured to update the switch flow table; and a front-end unit configured to relay a control message between the switch and the switch controller. The front-end unit includes: a buffer configured to temporarily store the control message received from the switch; a flow table storage section configured to store a flow table; and a buffer control section configured to buffer the control message which hits a buffer flow entry of the flow table in the buffer, and transmit the control message which does not hit any buffer flow entry of the flow table, to the switch controller without buffering in the buffer.

A method of reducing a transmission rate of a control message according to the present invention is a method executed in a network system which includes: a switch configured to transfer a packet based on a switch flow table; a switch controller configured to update the switch flow table; and a front-end unit configured to relay the control message between the switch and the switch controller. The method of reducing a transmission rate of a control message according to the present invention includes: temporarily storing the control message received from the switch in a buffer by the front-end unit; storing a flow table in a flow table storage section of the front-end unit; buffering the control message that hits the buffer flow entry of the flow table in the buffer by the buffer control section of the front-end unit; and transmit the control message that does not hit the buffer flow entry of the flow table to the switch controller without buffering in the buffer by the buffer control section of the front-end unit.

According to the present invention, the network system which can reduce the transmission rate of the control message between the switch and the switch controller can be provided.

DESCRIPTION OF EXEMPLARY EMBODIMENTS

Hereinafter, a network system according to exemplary embodiments of the present invention will be described with reference to the attached drawings.

<Configuration>

Figure 1:
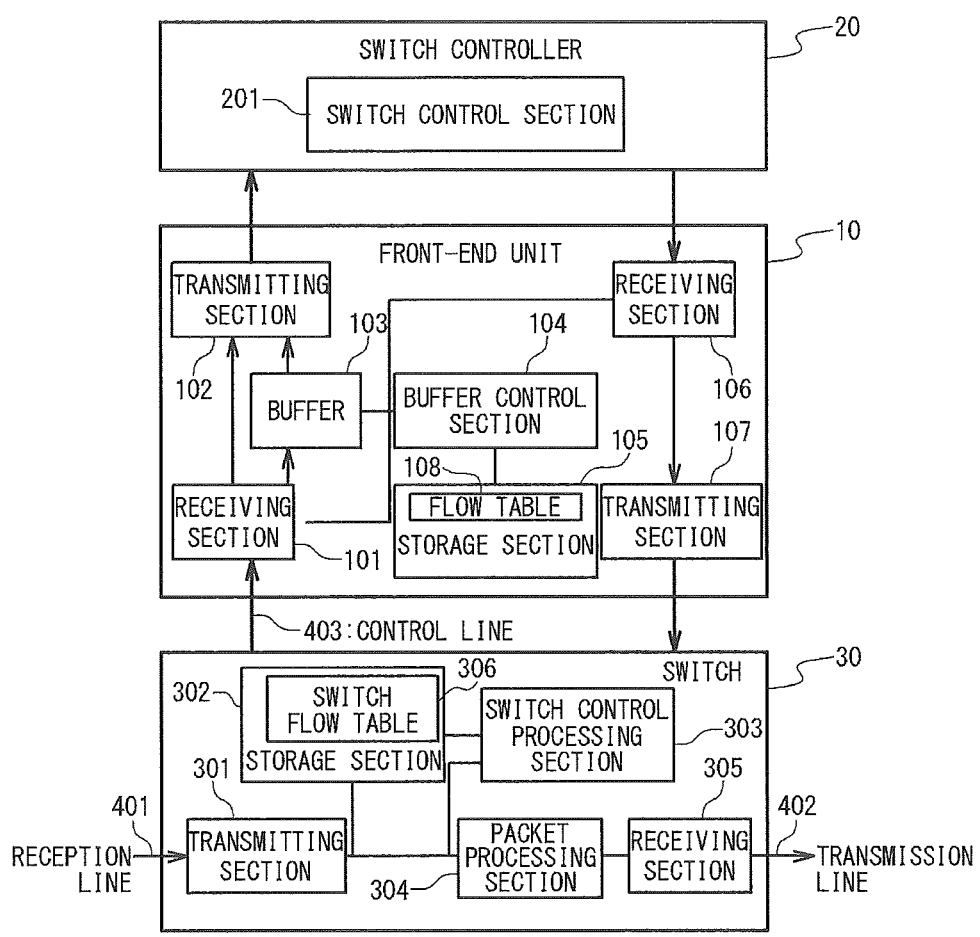
FIG. 1 is an internal block diagram of a front-end unit, a switch controller and a switch, which are contained by a network system in an exemplary embodiment of the present invention.

At first, the configuration of the network system in an exemplary embodiment will be described. The network system in the present exemplary embodiment contains a front-end unit 10, a switch controller 20 and a switch 30. FIG. 1 is an internal block diagram of the front-end unit 10, the switch controller 20 and the switch 30, which are contained in the network system according to the present exemplary embodiment of the present invention.

The front-end unit 10 contains a receiving section 101, a transmitting section 102, a buffer 103, a buffer control section 104, a flow table storage section 105, a receiving section 106 and a transmitting section 107.

The receiving section 101 receives a control message transmitted from the switch 30 through a control line 403. The transmitting section 102 transmits the control message received by the receiving section 101 to the switch controller 20.

The buffer 103 temporarily stores the control message transmitted from the switch 30 to the switch controller 20. The buffer control section 104 uses the buffer 103 and a flow table 108 stored in the flow table storage section 105, and controls a transmission rate of the control message between the switch 30 and the switch controller 20. When the control message received by the receiving section 101 hits a buffer flow entry of the flow table 108, the received control message is buffered in the buffer 103 by the buffer control section 104. Also, when the control message received by the receiving section 101 hits a switch flow entry of the flow table 108, the buffer control section 104 transmits the received message to the switch 30 so as to be returned.

The receiving section 106 receives the control message transmitted by the switch controller 20. The transmitting section 107 transmits the control message received by the receiving section 106 to the switch 30.

The switch controller 20 contains a switch control section 201. The switch control section 201 carries out a route calculation and the like on the basis of the control message received from the front-end unit 10, and determines an operation of the switch 30 corresponding to data of a transfer packet included in the control message, and generates a switch flow entry to be set in the switch flow table 306 of the switch 30. The switch control section 201 transmits the generated switch flow entry on the control message to the switch 30.

The switch 30 contains a receiving section 301, a storage section 302 having a switch flow table, a switch control processing section 303, a packet processing section 304 and a transmitting section 305.

The receiving section 301 receives a transfer packet through a reception line 401. The storage section 302 stores a switch flow table 306 for determining a transfer action on the basis of header data of the transfer packet. The packet that hits a switch flow entry in the switch flow table 306 is processed by the packet processing section 304 on the basis of action data 308 defined in the switch flow entry.

The switch control processing section 303 controls the entire operation of the switch 30. The packet processing section 304 determines a header rewriting process and an output port of the transfer packet on the basis of the action data 308 defined in the switch flow entry of the switch flow table 306. The transmitting section 305 transmits the transfer packet to a transmission line 402.

Figure 2:
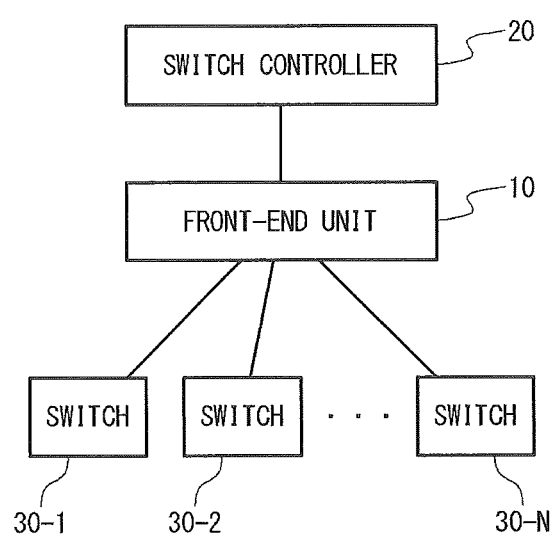
FIG. 2 is a diagram showing the entire network system according to the exemplary embodiment of the present invention.

FIG. 2 is a diagram showing the entire network system in the exemplary embodiment of the present invention. Each of switches 30-1 and 30-2 to 30-N are connected to the front-end unit 10, and the front-end unit 10 is further connected to the switch controller 20. Note that FIG. 2 shows only the connection state from the switch controller 20 to the switch 30, and a network configuration realized by the switches 30-1, and 30-2 to 30-N is omitted. The control message transmitted from each of the switches 30-1, and 30-2 to 30-N to the switch controller 20 is subjected to a determination of the buffering and then is transmitted to the switch controller 20.

<Operation Method>

A method of reducing a transmission rate of the control message between the switch 30 and the switch controller 20 in the network system of this exemplary embodiment will be described below.

Figure 3:
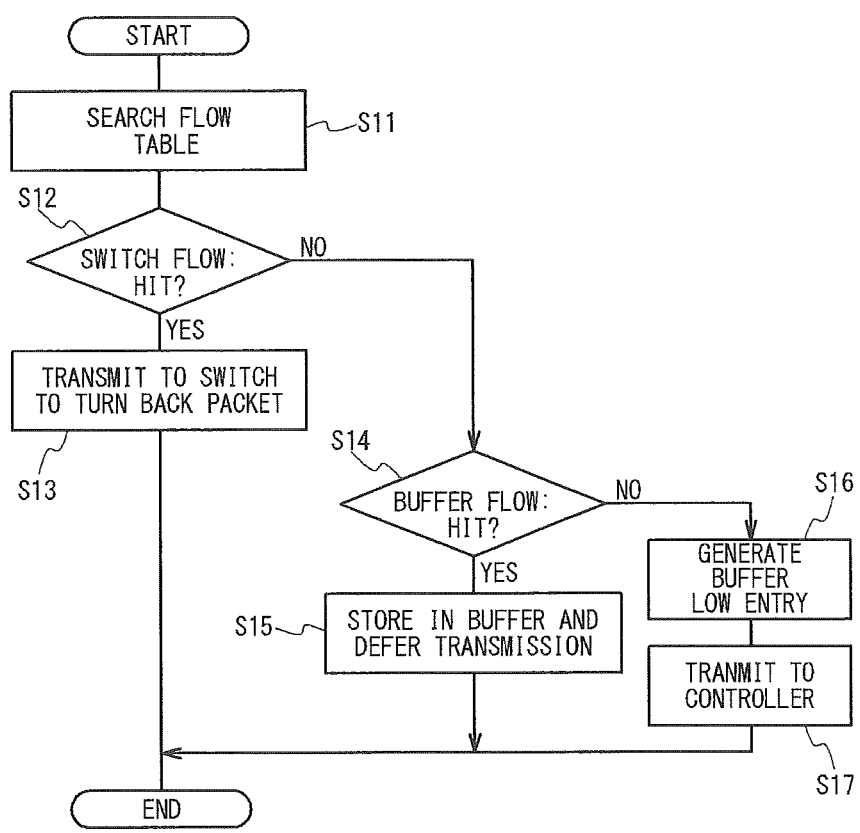
FIG. 3 is a flowchart showing a buffering method of a control message executed by the front-end unit in the network system according to the exemplary embodiment of the present invention.

The network system in this exemplary embodiment contains the front-end unit 10 disposed between the switch 30 and the switch controller 20 to buffer the control message, in order to reduce a transmission rate of the control message. At first, the buffering method of the control message will be described. FIG. 3 is a flowchart of a buffering method of the control message, which is carried out by the front-end unit 10 in the network system according to the exemplary embodiment of the present invention.

At first, the flow table 108 stored in the flow table storage section 105 in the front-end unit 10 and the switch flow table 306 stored in the switch flow table storage section 302 in the switch 30 will be described.

Figure 4:
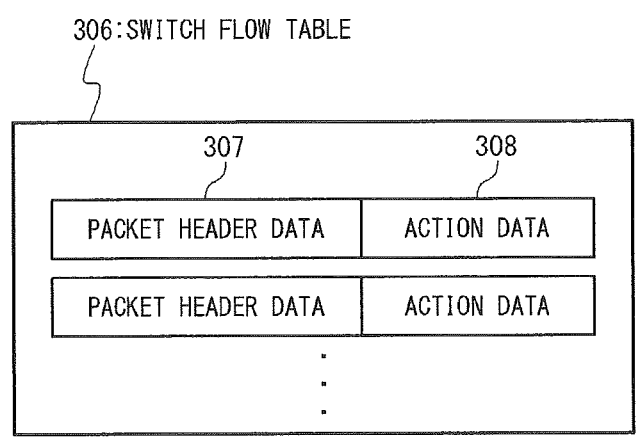
FIG. 4 is a diagram showing a switch flow table in the network system according to the exemplary embodiment of the present invention.

FIG. 4 is a diagram showing the switch flow table 306 in the network system according to the exemplary embodiment of the present invention. Each entry of the switch flow table 306 includes packet header data 307 and action data 308. In the switch flow table 306, the action data 308 of a packet rewriting process, a transmitting process to a predetermined transfer destination, and the like are defined for each packet header data 307.

Figure 5:
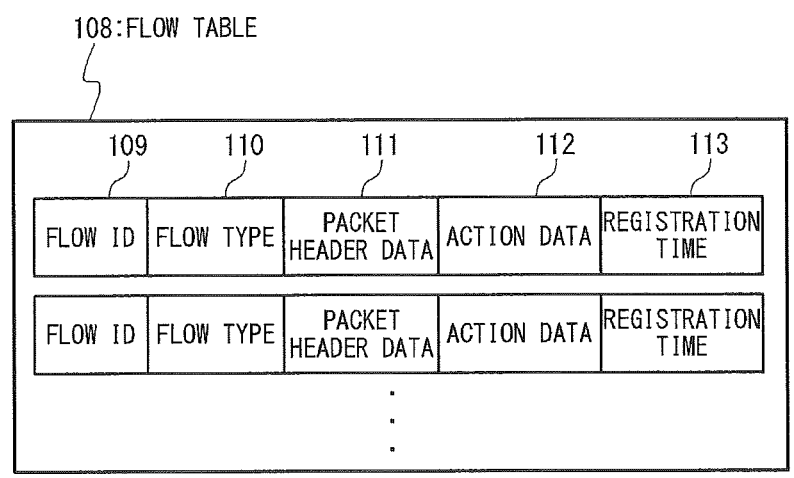
FIG. 5 is a diagram showing a flow table in the network system according to the exemplary embodiment of the present invention.

FIG. 5 is a diagram showing the flow table 108 in the network system according to the exemplary embodiment of the present invention. The flow table 108 includes a flow ID 109, a flow type 110, packet header data ill, action data 112 and a registration time 113. The flow ID 109 is an ID for identifying the flow entry. The flow type 110 indicates a type of the flow table, and there are a buffer flow entry and a switch flow entry. The packet header data 111 is header data of the packet as a transfer target received by the switch 30, which is included in the control message received by the receiving section 101. The action data 112 defines the process of a step S13 and a step S15 that will be described below. That is, by changing the action data 112, it is possible to change the process of the step S13 and the step S15. For example, the control message which hits at the step S14 can change the process to be discarded without buffering by the buffer 103. The registration time 113 is a time when the flow entry is registered in the flow table 108.

(Step S11)

The receiving section 101 of the front-end unit 10 receives a packet through the control line 403. The buffer control section 104 extracts header data of the control message, and searches a switch flow entry corresponding to the header data for the flow table 108 stored in the flow table storage section 105 by using the extracted header data as a key. The searched switch flow entry is set in the flow table 108 of the front-end unit 10, when the switch flow entry is set in the switch flow table 306 of the switch 30 through the front-end unit 10 from the switch controller 20 (Step S35 in FIG. 6).

(Step S12)

The buffer control section 104 determines which of the switch flow entries of the flow table 108 the header data extracted at the step S11 hits. If the header data hits, the control advances to a step S13, and if the header data does not hit, the control advances to a step S14.

(Step S13)

The buffer control section 104 regards that the corresponding switch flow entry has been already registered in the switch flow table of the switch 30 by the switch controller 20, and transmits and returns the control message to the switch 30. When transmitting and returning the control message to the switch 30, the buffer control section 104 changes the packet header data of the control message on the basis of the action data of the flow table 108. The buffer control section 104 rewrites the data indicative of "Packet Reception" included in the packet header data of the control message received from the switch 30, to the data indicative of "Packet Transmission".

Note that when the switch flow entry of the switch flow table 306 in the switch 10 is lost due to a reason such as an apparatus re-start, an inquiry to the switch controller 20 is again generated with regard to the transfer of the same packet. When such a case cannot be detected and the control message is returned, the flow setting is not carried out to the switch 10. For this reason, a timeout of about 10 seconds may be set in an entry holding period of the flow table 108 in the front-end unit 10. Note that the time of timeout may be properly changed based on an operation environment.

(Step S14)

The buffer control section 104 determines whether or not the control message received by the receiving section 101 hits either of the buffer flow entries of the flow table 108 stored in the flow table storage section 105. If the control message hits one buffer flow entry, the control advances to the step S15, and if the control message does not hit any buffer flow entry, the control advances to a step S16.

(Step S15)

The buffer control section 104 stores the control message which hits the buffer flow entry at the step S14, in the buffer 103, and suspends the transmission to the switch controller 20.

(Step S16)

The buffer control section 104 generates a buffer flow entry of the flow table 108 corresponding to the control message that does not hit the buffer flow entry at the step S14.

(Step S17)

The buffer control section 104 transmits the control message in which the buffer flow entry of the flow table 108 has been generated at the step S16, to the switch controller 20.

By the above buffering method of the control message, the front-end unit 10 can prevent the similar control message received from the switch 30 from being continuously transmitted to the switch controller 20 (if the control message hits the buffer flow entry). Also, the control message corresponding to the switch flow already registered in the switch flow table 306 in the switch 30 can be prevented from being transmitted to the switch controller 20 (if the control message hits the switch flow entry). By the above buffering method of the control message, it is possible to reduce a transmission rate of the control message between the front-end unit 10 and the switch controller 20.

Figure 6:
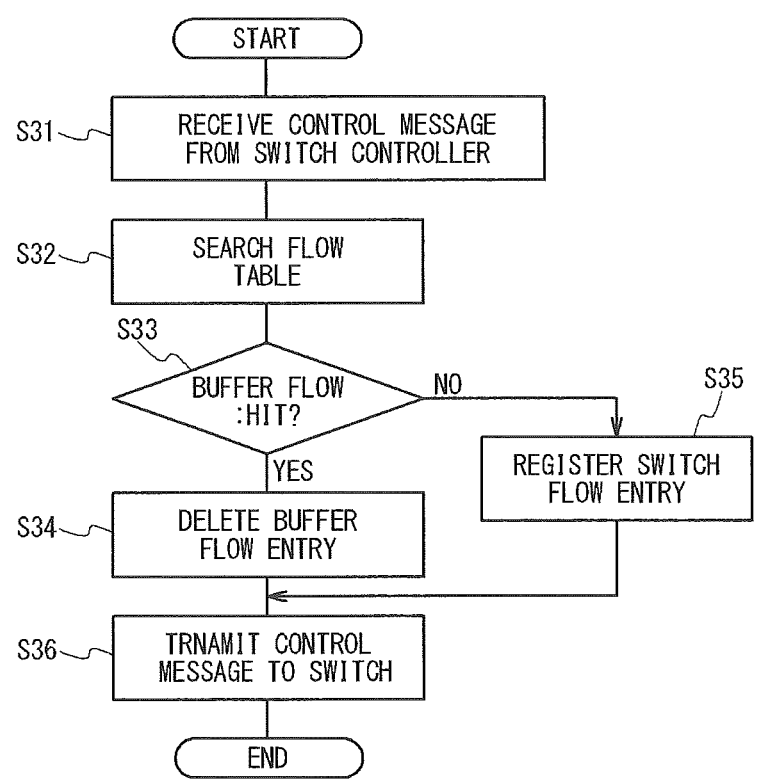
FIG. 6 is a flowchart showing an operation method when the front-end unit receives a control message from the switch controller in the network system according to the exemplary embodiment of the present invention.

Next, an operation method when the front-end unit 10 receives the control message from the switch controller 20 will be described with reference to FIG. 6.

(Step S31)

The receiving section 106 in the front-end unit 10 receives the control message from the switch controller 20.

(Step S32)

The buffer control section 104 extracts the header data of the control message and determines whether or not a corresponding buffer flow entry exists in the flow table 108 stored in the flow table storage section 105, by using the extracted header data as a key.

(Step S33)

The buffer control section 104 determines whether or not the control message received by the receiving section 101 hits either of buffer flow entries of the flow table 108. If the control message hits one buffer flow entry, the control advances to a step S34, and if the control message does not hit any buffer flow entry, the control advances to a step S36.

(Step S34)

The buffer control section 104 deletes the buffer flow entry of the flow table 108 corresponding to the control message that has hit the buffer flow entry at the step S33. The buffer control section 104 acquires the packet header data 111 corresponding to the buffer flow entry from the buffer 103, and rewrites the hit control message to a suitable control message destined to the switch 30. If the control message from the switch controller 20 is "Generation of Switch Flow Table", the buffer control section 104 generates the control message of "Packet Transmission" specified in the switch flow table 306 of the switch 30 on the basis of an action specified by the flow table 108. If the control message from the switch controller 20 is "Packet Transmission", the buffer control section 104 acquires a packet transmission destination data from the packet header data 111 corresponding to the buffer flow entry, and generates the control message of "Packet Transmission".

(Step S35)

The buffer control section 104 sets the same switch flow entry as the switch flow entry set in the switch flow table 306 of the switch 30, in the flow table 108 on the basis of the control message received by the receiving section 106. The buffer control section 104 searches a switch flow entry with a priority higher than that of the buffer flow entry, upon the search of the flow entry.

(Step S36)

The transmitting section 107 transmits the control message received by the receiving section 106 to the switch 30. At the step S34, when the control message that hits the buffer flow entry is rewritten to a proper control message destined to the switch 30, the rewritten control message is transmitted to the switch 30.

The above-mentioned method deletes the buffer flow entry of the flow table 108. However, when the control message corresponding to the buffer flow entry is not transmitted from the switch controller 20 to the front-end unit 10, as in case that the control message is discarded in the switch controller 20, the buffer flow entry remains in its stored state. For this reason, the buffer control section 104 refers to the registration time 113 of the flow table 108 and deletes the buffer flow entry after the elapse of a predetermined time.

With regard to the control message stored in the buffer 103, the buffer control section 104 monitors a rate of the control message received from the switch 30. When the rate becomes equal to or less than a certain value, the buffer control section 104 transmits the control message of the buffer 103 through the transmitting section 102 to the switch controller 20.

According to the present exemplary embodiment, when the similar messages are continuous from the switch 30 to the switch controller 20, the front-end unit 10 can suppress an amount of the control messages. Also, when the switch flow corresponding to the control message can be regarded as being already registered in the switch flow table 306, the control message is transmitted and returned to the front-end unit 10. For this reason, the load of the switch controller 20 can be decreased.

Figure 7:
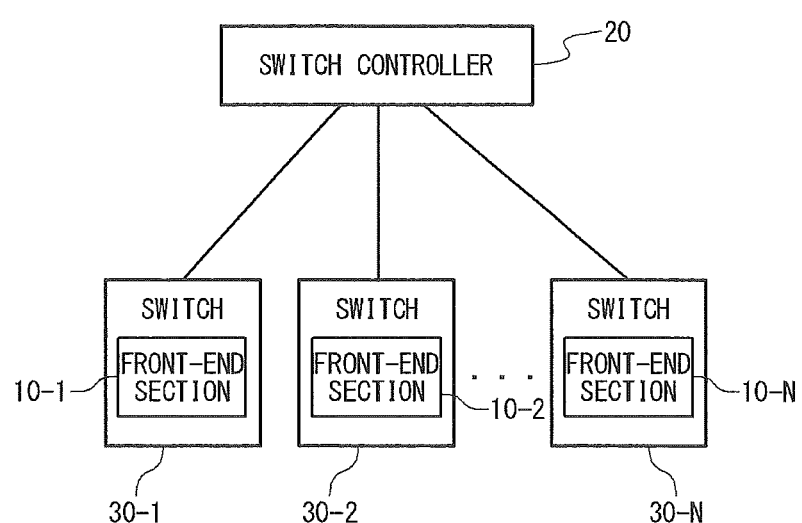
FIG. 7 is a diagram showing the entire network system according to another exemplary embodiment of the present invention.

In the present exemplary embodiment, the front-end unit 10 is configured as shown in FIG. 2. However, as shown in FIG. 7, the buffering process of the front-end unit 10 may be realized as front-end units 10-1 to 10-N, in respective switches 30-1 to 30-N.

As such, the exemplary embodiments of the present invention have been described with reference to the attached drawings. However, the present invention is not limited to the above-mentioned exemplary embodiments and may be properly modified by one skilled in the art, in a range without departing from the scope and spirit of the present invention.

The invention claimed is:

1. A network system, comprising:
a plurality of switches, each of which is configured to transfer a packet based on a switch flow table;
a switch controller configured to update the switch flow table of said each switch; and
a front-end unit configured to relay a control message between said each switch and said switch controller, wherein said front-end unit comprises:
a buffer configured to temporarily store the control message received from said each switch;
a flow table storage section configured to store a flow table; and
a buffer control section configured to buffer the control message which hits a buffer flow entry of the flow table in said buffer, and transmit the control message which does not hit any buffer flow entry of the flow table, to said switch controller without buffering in said buffer.

2. The network system according to claim 1, wherein the flow table further includes a switch flow entry, and
wherein said buffer control section transmits and returns the control message which hits the switch flow entry to said each switch.

3. The network system according to claim 2, wherein the flow table includes:
a flow ID for identifying a flow entry;
a flow type for showing whether or not the flow entry is the buffer flow entry or the switch flow entry;
header data of a packet as a transfer object by said each switch which is contained in the control message; and
action data defining an action to the packet which contains the header data.

4. The network system according to claim 1, wherein, when the control message received from said each switch does not hit any buffer flow entry of the flow table, said buffer control section generates a buffer flow entry of the flow table corresponding to the control message, and when the control message received from said each switch hits a buffer flow entry of the flow table, said buffer control section does not generate any buffer flow entry of the flow table.

5. The network system according to claim 1, wherein said buffer control section monitors a rate of the control message received from said each switch, and transmits the control message buffered in said buffer, to said switch controller when the rate becomes equal to or less than a predetermined value.

6. The network system according to claim 2, wherein said buffer control section searches the flow table for a buffer flow entry of when the control message is received from said switch controller, deletes the buffer flow entry from the flow table, when there is the buffer flow entry corresponding to the control message, and registers a switch flow entry on the flow table, when there is not any buffer flow entry corresponding to the control message.

7. The network system according to claim 3, wherein the buffer flow entry of the flow table contains a registration time of the control message transmitted to said switch controller, and
wherein said buffer control section refers to the registration time of the flow table to delete the buffer flow entry which has passed for a predetermined time.

8. A method of reducing a transmission rate of a control message in a network system which comprises:
a plurality of switches, each of which is configured to transfer a packet based on a switch flow table;
a switch controller configured to update the switch flow table of said each switch; and
a front-end unit configured to relay the control message between said each switch and said switch controller,
said method comprising:
temporarily storing the control message received from said each switch in a buffer by said front-end unit;
storing a flow table in a flow table storage section of said front-end unit;
buffering the control message that hits a buffer flow entry of the flow table in said buffer by said buffer control section of said front-end unit; and
transmitting the control message that does not hit any buffer flow entry of the flow table to said switch controller without buffering in said buffer by a buffer control section of said front-end unit.

9. The method of reducing a transmission rate of a control message according to claim 8, wherein the flow table includes a switch flow entry, and
wherein said method further comprises transmitting and returning the control message which hits the switch flow entry to said each switch by said buffer control section.

10. The method of reducing a transmission rate of a control message according to claim 8, further comprising:
generating a buffer flow entry of the flow table corresponding to the control message by said buffer control section of said front-end unit, when the control message received from said each switch does not hit the buffer flow entry of the flow table.

11. The method of reducing a transmission rate of a control message according to claim 8, further comprising:
monitoring a rate of the control message received from said each switch by said buffer control section of said front-end unit; and
transmitting the control message buffered in said buffer to said switch controller by said buffer control section of said front-end unit, when the rate becomes equal to or less than a predetermined value.

12. The method of reducing a transmission rate of a control message according to claim 9, further comprising:
searching the buffer flow entry of the flow table by said buffer control section of said front-end unit when the control message is received from the said switch controller;
deleting a corresponding buffer flow entry from the flow table by the buffer control section of the front-end unit, when there is the buffer flow entry corresponding to the control message; and
registering a switch flow entry on the flow table by the buffer control section of the front-end unit when there is not the buffer flow entry corresponding to the control message.

13. The method of reducing a transmission rate of a control message according to claim 8, wherein the buffer flow entry of the flow table comprises a registration time of the control message transmitted to said switch controller, and
wherein said method further comprises:
referring to the registration time of the flow table by said buffer control section of said front-end unit; and
deleting the buffer flow entry having passed for a predetermined time by said buffer control section of said front-end unit.

14. A front-end unit which relays a control message between a plurality of switches, each of which is configured to transfer a packet based on a switch flow table and a switch controller configured to update the switch flow table of said each switch, said front-end unit comprising:
a buffer configured to temporarily store the control message received from said each switch;
a flow table storage section configured to store a flow table; and
a buffer control section configured to buffer in said buffer, a control message which hits a buffer flow entry of the flow table, and transmit to said switch controller without buffering in said buffer, the control message which does not hit the buffer flow entry of the flow table.

15. The front-end unit according to claim 14, wherein the flow table includes a switch flow entry, and
wherein said buffer control section transmits and returns the control message which hits the switch flow entry, to said each switch.

16. The front-end unit according to claim 15, wherein the flow table comprises:
a flow ID for identifying a flow entry;
a flow type for showing whether the flow entry is a buffer flow entry or a switch flow entry;
header data of a packet as a transfer object by said each switch which is contained in the control message; and
action data for defining an action to the packet which contains the header data.

17. The front-end unit according to claim 14, wherein said buffer control section generates a buffer flow entry of the flow table corresponding to the control message, when the control message received from said each switch does not hit any buffer flow entry of the flow table, and does not generate any buffer flow entry of the flow table when the control message received from said each switch hits a buffer flow entry of the flow table.

18. The front-end unit according to claim 14, wherein said buffer control section monitors a rate of the control message received from said each switch, and transmits the control message buffered in said buffer, to said switch controller when the rate becomes equal to or less than a predetermined value.

19. A computer-readable non-transitory recording medium which stores a computer-executable a control message transmission rate reduction program to achieve a method of reducing a transmission rate of a control message in a network system which comprises:
a plurality of switches, each of which is configured to transfer a packet based on a switch flow table;
a switch controller configured to update the switch flow table of said each switch; and
a front-end unit configured to relay the control message between said each switch and said switch controller,
said method comprising:
temporarily storing the control message received from said each switch in a buffer by said front-end unit;
storing a flow table in a flow table storage section of said front-end unit;
buffering the control message that hits a buffer flow entry of the flow table in said buffer by said buffer control section of said front-end unit; and
transmitting the control message that does not hit any buffer flow entry of the flow table to said switch controller without buffering in said buffer by said buffer control section of said front-end unit.

20. The network system according to claim 1, wherein said each switch is connected to the switch controller through the front-end unit such that the control message transmitted from said each switch to the switch controller is subjected to a determination of a buffering and then is transmitted to the switch controller.

* * * * *